United States Patent
Becoulet et al.

(10) Patent No.: US 11,846,200 B2
(45) Date of Patent: Dec. 19, 2023

(54) DEVICE FOR CENTRING AND ROTATIONALLY GUIDING A TURBOMACHINE SHAFT COMPRISING SEVERAL OPTIMISED DAMPING FLUID FILMS

(71) Applicant: SAFRAN AIRCRAFT ENGINES, Paris (FR)

(72) Inventors: Julien Fabien Patrick Becoulet, Moissy-Cramayel (FR); Alexandre Jean-Marie Tan-Kim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 3 days.

(21) Appl. No.: 17/424,018

(22) PCT Filed: Jan. 17, 2020

(86) PCT No.: PCT/FR2020/050063
§ 371 (c)(1),
(2) Date: Jul. 19, 2021

(87) PCT Pub. No.: WO2020/152410
PCT Pub. Date: Jul. 30, 2020

(65) Prior Publication Data
US 2022/0099000 A1 Mar. 31, 2022

(30) Foreign Application Priority Data
Jan. 23, 2019 (FR) ..................... 19 00575

(51) Int. Cl.
*F01D 25/16* (2006.01)
*F01D 25/04* (2006.01)
*F16C 27/04* (2006.01)

(52) U.S. Cl.
CPC ........... *F01D 25/164* (2013.01); *F01D 25/04* (2013.01); *F16C 27/045* (2013.01);
(Continued)

(58) Field of Classification Search
CPC ...... F01D 25/164; F01D 25/04; F06C 27/045; F05D 2240/54; F05D 2260/96;
(Continued)

(56) References Cited

U.S. PATENT DOCUMENTS 3,844,630 A 10/1974 Lechner
4,547,083 A * 10/1985 Horler ................... F01D 25/164
384/535
(Continued)

FOREIGN PATENT DOCUMENTS

EP 0 143 950 A2 6/1985
EP 3 159 560 A1 4/2017
(Continued)

OTHER PUBLICATIONS

International Search Report dated Jun. 5, 2020 in PCT/FR2020/050063 filed on Jan. 17, 2020, 2 pages.
(Continued)

*Primary Examiner* — Yi-Kai Wang
(74) *Attorney, Agent, or Firm* — Oblon, McClelland, Maier & Neustadt, L.L.P.

(57) ABSTRACT

A device for centring and rotationally guiding a turbomachine shaft includes a rolling-element bearing outer ring; a bearing support having a radially inner annular surface surrounding the outer ring; a connection structure connecting the outer ring to the bearing support and including an elastically deformable structure; a first cavity formed between the radially inner annular surface and the outer ring to receive a first damping fluid film; at least one second cavity formed between the bearing support and the connec-
(Continued)

tion structure which is arranged radially outside the radially inner annular surface to receive a second respective damping fluid film. Such an arrangement allows for the coexistence of damping fluid films having very different damping properties.

14 Claims, 9 Drawing Sheets

(52) U.S. Cl.
CPC ...... *F05D 2240/54* (2013.01); *F05D 2260/96* (2013.01); *F16C 2360/23* (2013.01)

(58) Field of Classification Search
CPC ............ F05D 2230/644; F16C 2360/23; F16C 19/06; Y02T 50/60; F16F 15/0237
USPC ........................................................ 415/119
See application file for complete search history.

(56) References Cited

U.S. PATENT DOCUMENTS

| | | | |
|---|---|---|---|
| 7,517,152 | B1 | 4/2009 | Walsh |
| 2015/0030273 | A1* | 1/2015 | Sebald ................... F16C 27/04 384/462 |
| 2017/0114831 | A1 | 4/2017 | Snow et al. |

FOREIGN PATENT DOCUMENTS

| | | |
|---|---|---|
| FR | 2.198.572 | 3/1974 |
| GB | 1104478 | 2/1968 |
| GB | 2 107 002 A | 4/1983 |

OTHER PUBLICATIONS

Preliminary French Search Report dated Oct. 2, 2019 in French Patent Application No. 19 00575 filed on Jan. 23, 2019 (with translation of category of cited documents), 2 pages.

* cited by examiner

DEVICE FOR CENTRING AND ROTATIONALLY GUIDING A TURBOMACHINE SHAFT COMPRISING SEVERAL OPTIMISED DAMPING FLUID FILMS

TECHNICAL FIELD

The present invention relates to the field of turbomachines, in particular for aircraft, and relates more particularly to a device for centring and rotationally guiding a turbomachine rotor shaft, comprising a bearing with damping by compressible film, also referred to as an "SFD (squeeze film damping) bearing".

PRIOR ART

A device for centring and rotationally guiding a turbine-engine rotor shaft of the SFD bearing type is a known means for providing damping of vibrations of the shaft.

In such a device, the means for connecting the outer race of the bearing to a stator structure of the turbomachine comprise a structure that is elastically deformable in the radial direction, sometimes referred to as a "flexible cage" or "squirrel cage".

This elastically deformable structure enables the outer race of the bearing to move transversely, typically by following a translation movement on an elliptical path, also referred to as "orbiting", under the effect of vibrations of the shaft resulting for example from an imbalance.

In addition, a cavity supplied with oil is arranged between the outer race of the bearing and a bearing support surrounding the outer race and secured to the stator structure.

Thus the orbiting of the outer race leads to a crushing of the film of oil, this crushing giving rise to damping.

Such a damping capability makes it possible to reduce the design loads and therefore to lighten the structures, giving rise to a global reduction in mass.

However, with a given geometry of the SFD bearing, it is possible to dampen only one well defined vibration mode. An SFD bearing is therefore fully effective only in a relatively small range of rotation speeds of the shaft.

However, the rotor shafts in turbomachines vibrate in a plurality of modes corresponding to various rotation speeds of the shaft, generally very different from one another.

DESCRIPTION OF THE INVENTION

The aim of the invention is in particular to provide a simple, economical and effective solution to this problem.

For this purpose it proposes a device for centring and rotationally guiding a turbomachine shaft, comprising: a rolling-element bearing comprising an outer race defining a bearing axis; a bearing support comprising an annular body having a radially inner annular surface surrounding the outer race; a connecting structure connecting the outer race to the bearing support and comprising an elastically deformable structure by means of which the connecting structure is connected to the bearing support; and a first cavity formed between the radially inner annular surface of the annular body and the outer race to receive a first damping fluid film.

According to the invention, the device further comprises at least one second cavity formed between the bearing support and the connecting structure, and arranged radially outwards with respect to the radially inner annular surface of the annular body, to receive a second respective damping fluid film.

Such an arrangement allows the coexistence of damping fluid films having clearly distinct damping properties, so that these damping fluid films make it possible respectively to damp distinct, and potentially mutually distant, vibration modes of the shaft.

According to other advantageous aspects of the invention, the connection device has one or more of the following features, taken in isolation or in accordance with all the technically possible combinations:

said at least one second cavity comprises at least one second cavity that axially overlaps the first cavity;

said at least one second cavity comprises at least one second cavity having a thickness different from a thickness of the first cavity;

the annular body of the bearing support includes a radial annular portion that terminates, at the radially inner end thereof, in an annular heel defining the radially inner annular surface of the annular body, and wherein said at least one second cavity is arranged radially outwards with respect to the annular heel;

the connecting structure further includes an annular flange extending radially outwards from the outer race and connecting the outer race to the elastically deformable structure;

said at least one second cavity comprises at least one second cavity formed between the annular skirt, which extends from the annular body of the bearing support, and a cylindrical ring, which extends from the annular flange of the connecting structure;

the cylindrical ring extends axially between the annular flange of the connecting structure and the annular body of the bearing support;

the elastically deformable structure is formed from a plurality of small columns distributed around the bearing axis and each having a respective first part mounted on the annular flange of the connecting structure, and a respective second part spaced apart from the respective first part and mounted on the bearing support;

the bearing support includes an annular flange extending from the annular body, so that the annular body is arranged axially between the annular flange of the connecting structure and the annular flange of the bearing support;

the annular body of the bearing support includes a plurality of passages through which respective intermediate parts of the small columns extend respectively, arranged between the respective first parts and the respective second parts of the small columns;

the respective second parts of the small columns are mounted on the annular flange of the bearing support; and said at least one second cavity comprises a plurality of second cavities formed around the respective intermediate parts of at least some of the small columns, in corresponding passages of the annular body of the bearing support, to receive respectively a plurality of second damping fluid films;

the annular body of the bearing support includes at least one first channel for supplying damping fluid, extending between two consecutive passages of said plurality of passages, and emerging in the first cavity, to supply the first cavity with damping fluid intended to form the first damping fluid film.

The invention also relates to a turbomachine, comprising at least one shaft centred and rotationally guided by at least one device of the type described above.

BRIEF DESCRIPTION OF THE DRAWINGS

The invention will be better understood, and other details, advantages and features thereof will emerge from the reading of the following description made by way of non-limitative example and with reference to the accompanying drawings, wherein.

In all these figures, identical references can designate identical or similar elements.

DETAILED DESCRIPTION OF PREFERRED EMBODIMENTS

Figure 1:
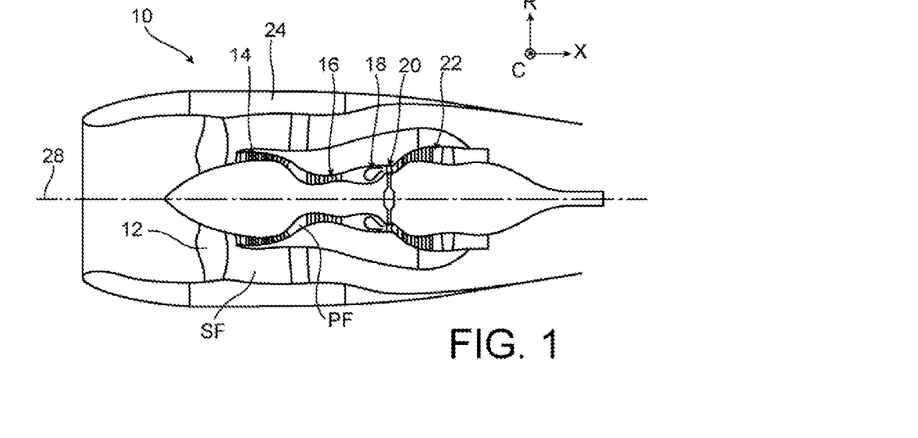
FIG. 1 is a schematic view in axial section of a turbomachine for an aircraft.

FIG. 1 illustrates a turbomachine 10 for an aircraft, for example a bypass turbojet engine, including in general terms a fan 12 intended for aspirating an air flow dividing downstream of the fan into a primary flow PF supplying a core of the turbomachine and a secondary flow SF bypassing this core. The core of the turbomachine includes, in general terms, a low-pressure compressor 14, a high-pressure compressor 16, a combustion chamber 18, a high-pressure turbine 20 and a low-pressure turbine 22. The turbomachine is streamlined by a nacelle 24 surrounding the flow space of the secondary flow SF. The rotors of the turbomachine are mounted so as to rotate about a longitudinal axis 28 of the turbomachine.

In the whole of this description, unless it is stipulated otherwise, the axial direction X is the direction of the longitudinal axis 28, the radial direction R is at every point a direction orthogonal to the longitudinal axis 28 and passing through the latter, and the circumferential or tangential direction C is at every point a direction orthogonal to the radial direction R and to the longitudinal axis 28. The term "transverse" refers to any element extending orthogonally to the longitudinal axis 28. The terms "inner" and "outer" refer respectively to a relative proximity, and a relative distancing, of an element with respect to the longitudinal axis 28. Finally, the directions "upstream" and "downstream" are defined with reference to the general direction of the flow of the primary PF and secondary SF flows in the turbomachine, in the axial direction X.

The invention is, in general terms, applicable to any type of turbomachine, whether it be single flow or multi-flow, single spool or multi-spool.

The invention relates more specifically to a device for the centring and rotational guidance of a shaft in such a turbomachine, of the SFD bearing type.

Figure 2:
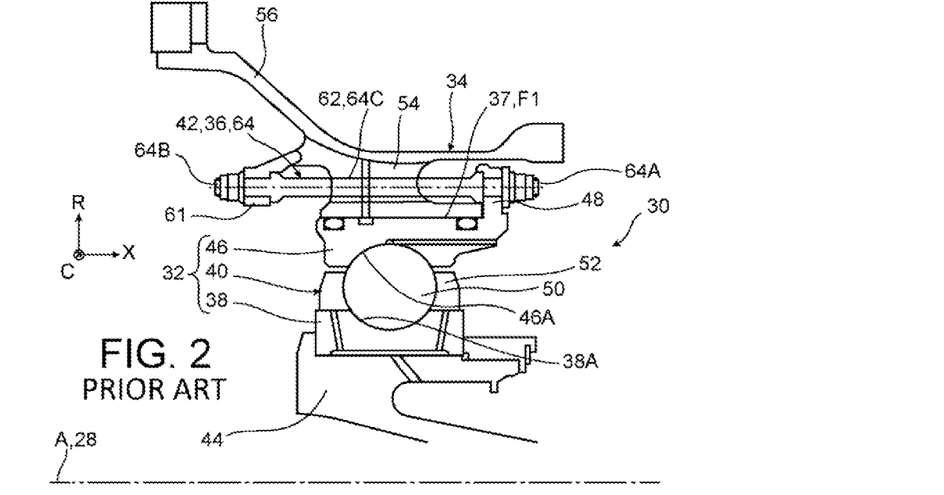
FIG. 2 is a schematic view in axial section to a larger scale of a device for the centring and rotational guidance of a shaft in such a turbomachine, intended to illustrate the problem that the invention sets out to solve.

FIG. 2 illustrates such a device 30, in a configuration that does not form part of the invention but the following description of which will illustrate the problem that the invention sets out to solve.

The orientation of this device is given purely for illustration, and the upstream and downstream directions mentioned in the following description may be reversed without departing from the scope of the invention.

The device 30 comprises, in general terms, a rolling-element bearing 32, a bearing support 34, an elastically deformable structure 36, and a cavity 37 intended to contain a damping fluid film F1. These elements are centred with respect to a bearing axis A, which corresponds to the longitudinal axis 28 of the turbomachine when the device 30 is installed in the turbomachine.

More precisely, the rolling-element bearing 32 includes an inner race 38, a bearing 40, and an outer race 46.

The inner race 38 is secured to a base 44, itself secured to a shaft connecting for example a compressor rotor to a turbine rotor in the turbomachine.

The device 30 comprises a connecting structure 42 connecting the outer race 46 to the bearing support 34. This connecting structure 42 includes for example the elastically deformable structure 36, by means of which the connecting structure 42 is connected to the bearing support 34, and an annular flange 48 connecting the outer race 46 to the elastically deformable structure 36. For this purpose, the annular flange 48 extends radially outwards from an axial end of the outer race 46, for example the downstream end thereof.

The bearing 40 is for example a ball bearing, comprising a plurality of balls 50 kept spaced apart from one another by a cage 52, and interposed between the inner race 38 and the outer race 46, in a well-known manner. In this regard, the inner race 38 and the outer race 46 typically include respective annular grooves 38A and 46A wherein the balls 50 are engaged. In a variant, the bearing 40 may be a rolling bearing.

Figure 3:
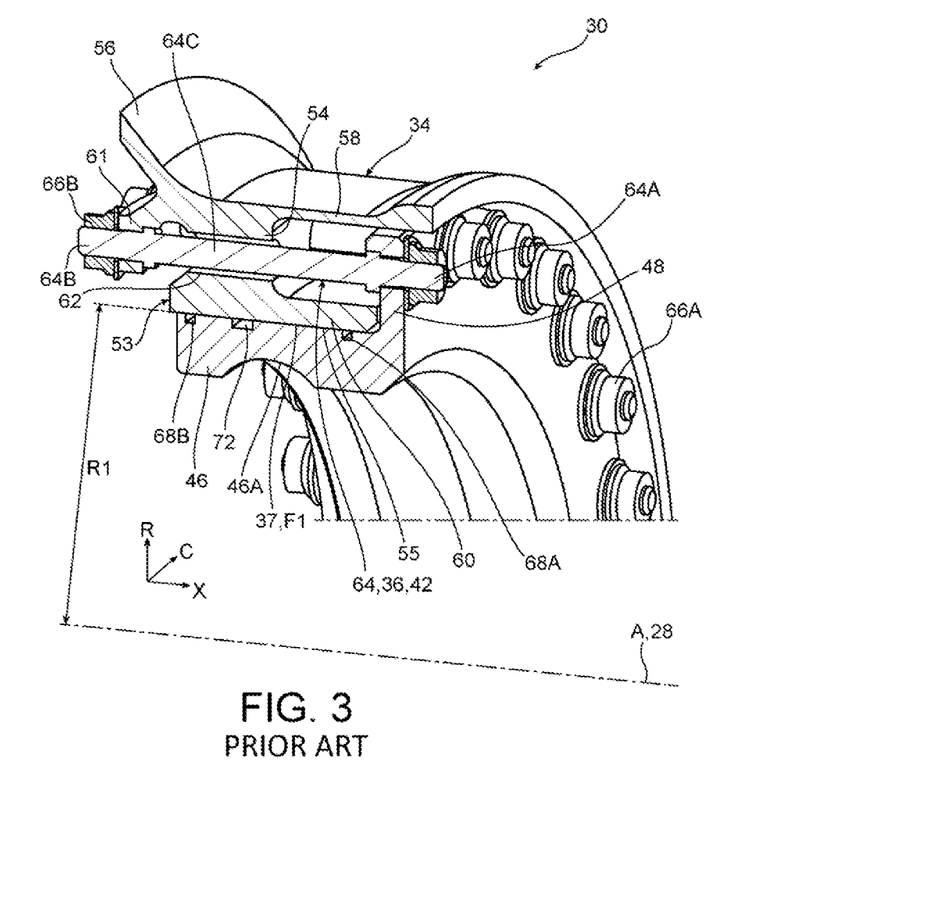
FIG. 3 is a partial schematic view in axial section of the device of FIG. 2.
Figure 4:
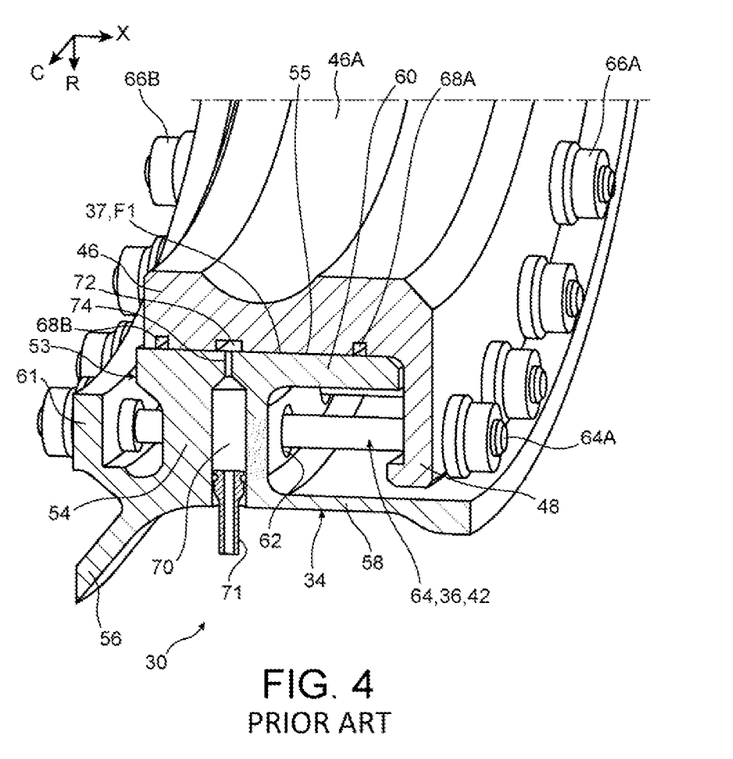
FIG. 4 is a partial schematic view in axial section of the device of FIG. 2.

In general terms, the bearing support 34 comprises an annular body 53 having a radially inner annular surface 55 that (directly) surrounds the outer race 46, as appears more clearly in FIGS. 3 and 4.

The annular body 53 has for example an L-shaped axial section. The annular body 53 therefore includes in this case a radial annular portion 54 that, at the radially inner end thereof, terminates in an annular heel 60, roughly cylindrical of revolution in form, that extends for example projecting downstream from the radial annular portion 54. The annular heel 60 thus defines the radially inner annular surface 55.

The annular body 53 is for example connected to an annular connecting flange 56 of the bearing support 34, extending upstream and radially outwards, and by means of which the bearing support 34 is fixed to the stator of the turbomachine. More precisely, the annular connecting flange 56 is for example connected to the radially outer end of the radial annular portion 54 of the annular body 53.

The bearing support 34 further includes an annular skirt 58, roughly cylindrical of revolution in form, extending from the annular body 53 of the bearing support, radially outwards with respect to the annular heel 60, for example on the axial side opposite to the annular connecting flange 56, in this case on the downstream side with respect to the annular body 53. More precisely, the annular skirt 58 is for example connected to the radially outer end of the radial annular portion 54 of the annular body 53.

Finally, the bearing support 34 includes for example an annular flange 61 connected to the annular body 53 and extending transversely, upstream and at a distance from the annular body 53. The annular flange 61 is for example connected to the radially outer end of the radial annular portion 54 of the annular body 53.

The elastically deformable structure 36 connects the annular flange 48 of the connecting structure 42 to the annular flange 61 of the bearing support 34.

For this purpose, the annular body 53 of the bearing support 34 includes a plurality of passages 62 that pass right through this annular body 53 in the axial direction to enable the elastically deformable structure 36 to pass through the annular body 53, as will appear more clearly hereinafter. In the embodiments illustrated, the passages 62 are arranged in the radial annular portion 54 of the annular body 53.

The elastically deformable structure 36 is for example formed by a plurality of small columns 64, that is to say elements in the form of a rod, each having a respective first part 64A mounted on the annular flange 48 of the connecting structure 42, for example by bolting by means of nuts 66A, and a respective second part 64B spaced apart from the first part 64A and mounted on the bearing support 34, or more precisely on the annular flange 61 thereof, for example also by bolting by means of nuts 66B. The first part 64A and the second part 64B of each small column 64 are preferably respectively defined at two opposite ends of the small column.

The small columns 64 furthermore each include a respective intermediate part 64C arranged between the respective first part 64A and the respective second part 64B. The respective intermediate parts 64C of the small columns 64 extend respectively through the passages 62 of the annular body 53 of the bearing support 34, with a certain clearance allowing a certain flexing movement of the small columns 64.

Finally, the cavity 37 is formed between the radially inner annular surface 55, defined by the annular body 53 of the bearing support 34, and the outer race 46. It must be understood thereby that the cavity 37 is delimited internally by the outer race 46 and is delimited externally by the radially inner annular surface 55 of the annular body 53. The cavity 37 is thus arranged at a certain radial distance R1 from the bearing axis A, corresponding in this case to an outer radius of the outer race 46.

In the example illustrated, the outer race 46 is formed in a single piece.

In a variant, the outer race 46 may be in several parts. In particular, the outer race 46 may include an inner annular element defining a track for the bearing 40, and an outer annular element connected to the connecting structure or formed in a single piece with the latter, and defining an embedding connection with the inner annular element. In this case, the first cavity 37 is defined between the radially inner annular surface 55, defined by the annular body 53 of the bearing support 34, and the outer annular element of the outer race 46.

The cavity 37 is typically delimited axially by two annular seals or two opposite sealing elements 68A and 68B, disposed respectively in two annular grooves formed for example by the outer race 46.

In a variant, the cavity 37 may be open axially so as to define, at one or two axial ends of the cavity, a controlled leakage section.

In addition, a channel supplying damping fluid 70 (FIG. 4), intended to supply the cavity 37 with damping fluid, extends through the annular body 53 of the bearing support 34, and emerges in the cavity 37. In the turbomachine, the channel supplying damping fluid 70 is connected to a unit supplying damping fluid, which is not visible in FIGS. 2-4 with the exception of a pipe 71 (FIG. 4) through which the unit supplying damping fluid is connected to the channel supplying damping fluid 70.

The outer race 46 advantageously includes an annular distribution groove 72 arranged opposite an outlet 74 of the channel 70 supplying damping fluid, so as to facilitate the distribution of the damping fluid all around the bearing axis A, in the cavity 37.

The damping fluid used is in general oil.

In operation, the flexing movement of the small columns 64 allows slight transverse movement of the outer race 46 caused by the vibrations of the shaft, while the cavity 37 receives damping fluid through the supply channel 70 so that the damping fluid film F1 forms in the cavity 37. The damping fluid film F1 damps transverse movements of the outer race 46 and therefore damps vibrations of the shaft.

The damping properties of the damping fluid film F1 depend on various geometric and operational parameters, in particular the axial extent of the cavity 37, the (radial) thickness of the cavity 37, the radius of implantation of the cavity 37, i.e. the radial distance separating the cavity 37 from the bearing axis A, and the pressure of the damping fluid.

Thus, as explained above, with a device of this type, only one vibration mode of the shaft can be effectively damped. Such a vibration mode corresponds in general to a relatively small range of rotation speeds of the shaft.

To make it possible to damp a plurality vibration modes of the shaft, corresponding to rotation speeds of the shaft that may be mutually distant, the invention proposes an improvement to the above device 30, consisting in providing the device 30 with at least one second damping fluid film formed between the bearing support 34 and the connecting structure 42, and arranged radially outwards with respect to the radially inner annular surface 55 of the annular body 53 of the bearing support 34.

In other words, the invention consists in providing at least one second cavity, formed between the bearing support 34 and the connecting structure 42, and arranged radially outwards with respect to the radially inner annular surface 55. "Formed between" also means here that the second cavity or each second cavity is delimited by the elements in question. The second cavity or each second cavity is connected to a corresponding second channel for supplying damping fluid, suitable for supplying damping fluid, as will appear more clearly hereinafter.

Such an arrangement allows the coexistence of damping fluid films having clearly distinct damping properties, in particular with regard to film thickness, film length, and radius of implantation, so that these damping fluid films make it possible to respectively damp distinct vibration modes of the shaft, corresponding to rotation speeds of the shaft that may be mutually distant.

For convenience, the cavity 37 will be referred to as the "first cavity" hereinafter, the channel 70 supplying damping fluid will be called the "first channel for supplying damping fluid", and the damping fluid film F1 will be called the "first damping fluid film".

Thus, in the embodiments of the invention as in the device 30 described above, and the first cavity 37 is spaced apart from the bearing axis A by a first radial distance R1, the first cavity 37 is formed between the radially inner annular surface 55 of the annular body 53 of the bearing support 34 and the outer race 46. In addition, the first cavity 37 is connected to at least one first channel 70 for supplying damping fluid.

It should be noted that the second cavity or each second cavity is therefore spaced apart from the bearing axis A by a second radial distance R2 strictly greater than the first radial distance R1.

Figure 5:
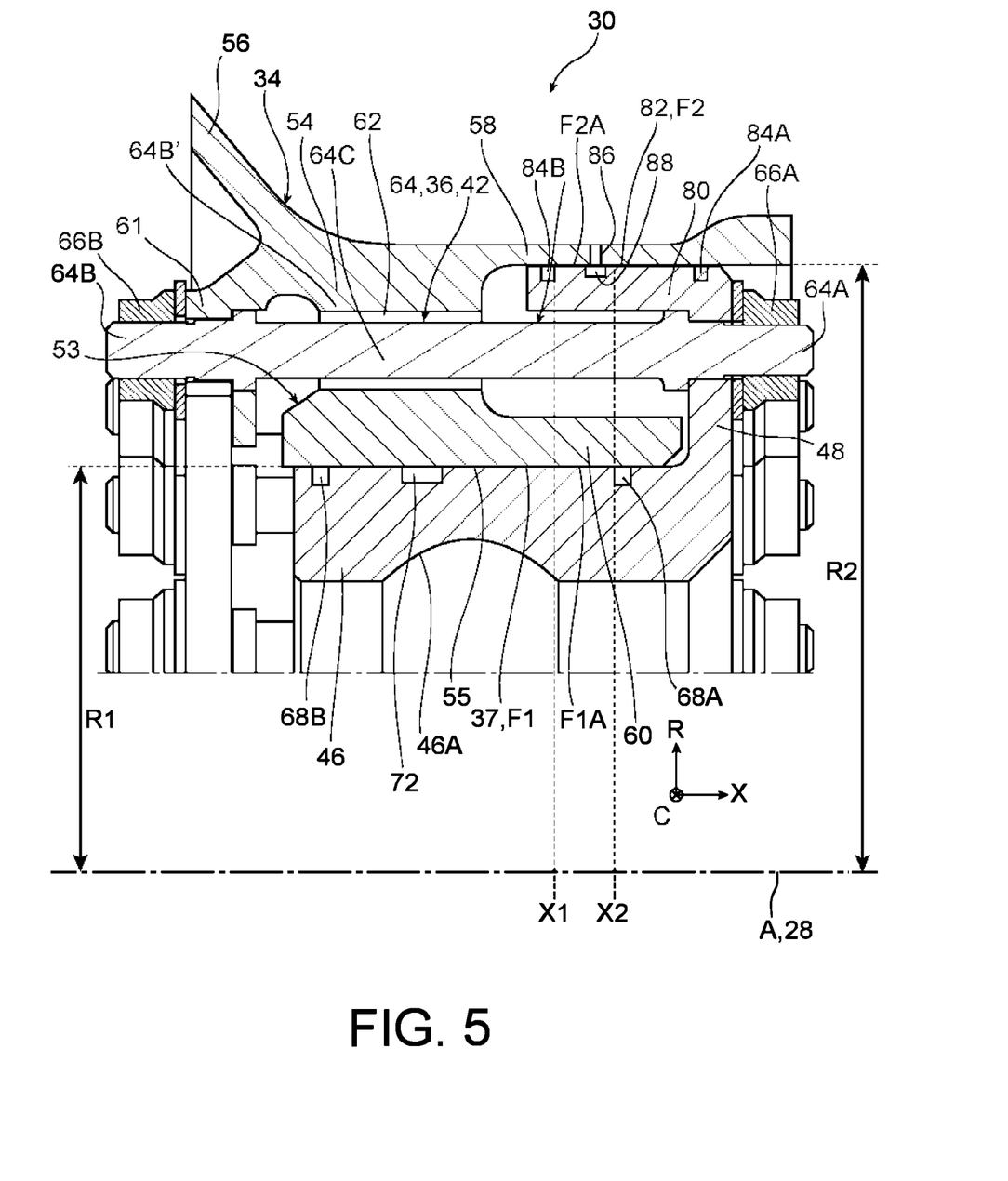
FIG. 5 is a view similar to FIG. 3, illustrating a device for the centring and rotational guidance of a shaft in a turbomachine, according to a first preferred embodiment of the invention.
Figure 6:
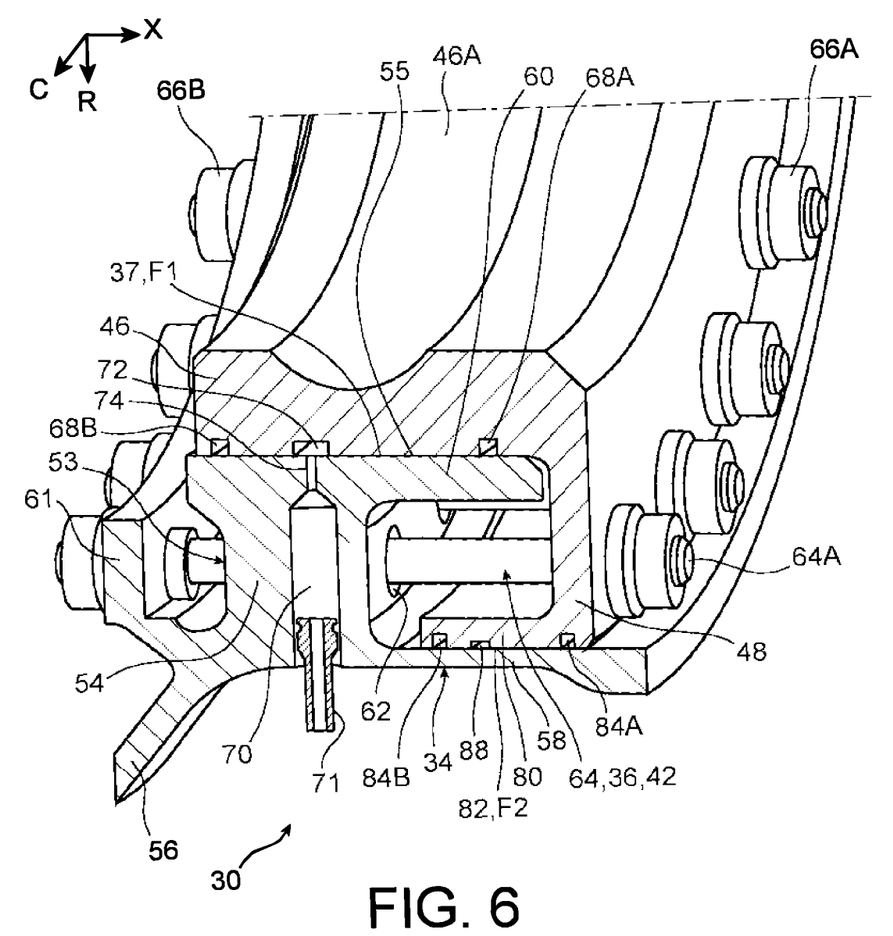
FIG. 6 is a view similar to FIG. 4, illustrating the device for the centring and rotational guidance of a shaft in a turbomachine, according to a first preferred embodiment of the invention.

FIGS. 5 and 6 illustrate a device 30 according to a first embodiment of the invention, wherein the connecting structure 42 includes a cylindrical ring 80 that extends from the annular flange 48, radially opposite the annular skirt 58 of the bearing support 34. In addition, a second damping fluid film F2 is formed between the annular skirt 58 and the cylindrical ring 80. The second damping fluid film F2 therefore extends over 360 degrees around the bearing axis A.

Thus a second cavity 82 is formed between the annular skirt 58 and the cylindrical ring 80 to receive the second damping fluid film F2. This second cavity 82 is therefore, in more general terms, formed between the bearing support 34 and the connecting structure 42, and radially outwards with respect to the radially inner surface 55. In addition, the second radial distance R2 therefore corresponds here to an external radius of the cylindrical ring 80.

The second cavity 82 is typically delimited axially by two opposite annular seals or sealing segments 84A and 84B, disposed respectively in two annular grooves formed in the cylindrical ring 80, or, in a variant, in the annular skirt 58.

The second cavity 82 is furthermore connected to at least one second channel 86 for supplying damping fluid, formed through the bearing support 34, in this case through the annular skirt 58.

In the turbomachine, the second channel 86 for supplying damping fluid is connected to the unit supplying damping fluid, which is not visible in the figures.

The cylindrical ring 80 advantageously includes an annular distribution group 88 arranged facing an outlet of the second channel 86 for supplying damping fluid, so as to facilitate the distribution of the damping fluid all around the bearing axis A, in the second cavity 82. In a variant, such an annular distribution groove may be formed in the annular skirt 58, in which case the second channel 86 for supplying damping fluid emerges through the annular distribution groove.

In the example illustrated, the second damping fluid film F2 axially overlaps the first damping fluid film F1. In other words, the first damping fluid film F1 and the second damping fluid film F2 include respective portions F1A and F2A (FIG. 5) arranged opposite each other radially, i.e. defined between two common axial dimensions X1 and X2. Such a configuration optimises the compactness of the device 30, or conversely maximises the volume available for the second damping fluid film F2 for a given overall size of the device 30. It is thus possible to arrange the first and second cavities 37, 82 so that they have very different volumes, so as to allow damping of distinct vibration modes, as will appear more clearly hereinafter.

Thus, in preferred embodiments of the invention, the first and second cavities 37, 82 have in particular different respective thicknesses.

In addition, the cylindrical ring 80 preferably extends in the direction of the annular body 53 of the bearing support 34, from the annular flange 48 of the connecting structure 42. In other words, the cylindrical ring 80 extends axially between the annular flange 48 and the annular body 53. Part of the cylindrical ring 80 thus extends around the annular heel 60. In addition, the cylindrical ring 80 is preferably arranged at a radially outer end of the annular flange 48.

The operation of the device 30 in FIGS. 5 and 6 is similar to that of the device 30 in FIGS. 2-4 but differs from the latter through the presence of the second cavity 82, which can receive damping fluid through the second channel 86 for supplying damping fluid, to form the second damping fluid film F2 in the second cavity 82. The second damping fluid film F2 damps transverse movements of the outer race 46 and therefore damps vibrations of the shaft.

Because of the configuration of the device 30 of FIGS. 5 and 6, the geometric and operational parameters of the second damping fluid film F2 can easily be defined so that the damping properties of the second damping fluid film F2 enable it to damp a vibration mode different from the one damped by the first damping fluid film F1. The conjoint use of the two damping fluid films F1 and F2 can furthermore make it possible to damp yet another vibration mode of the shaft.

Figure 7:
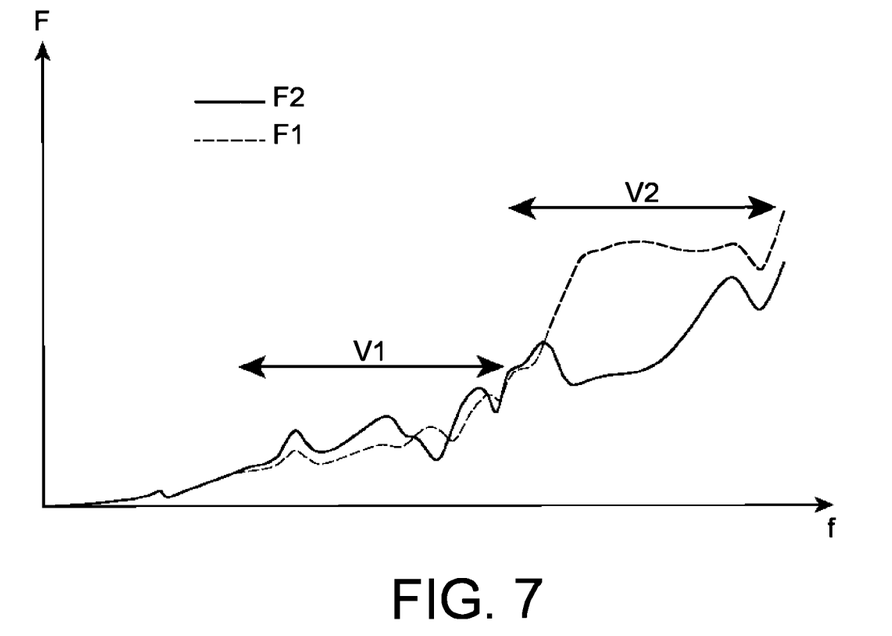
FIG. 7 is a graph illustrating the respective damping capabilities of two damping fluid films of the device of FIGS. 5 and 6.

Thus FIG. 7 is a graph illustrating the force F transmitted to the bearing support 34 by the connecting structure 42 in a given imbalance condition, during the use of the first damping fluid film F1 (in a broken line) and of the second damping fluid film F2 (in a continuous line), as a function of the rotation speed F of the shaft.

This graph makes it possible to determine that, in a particular example implemented by the inventors, the first damping fluid film F1 is preferable in a lower speed range V1 while the second damping fluid film F2 is preferable in a higher speed range V2.

Figure 8:
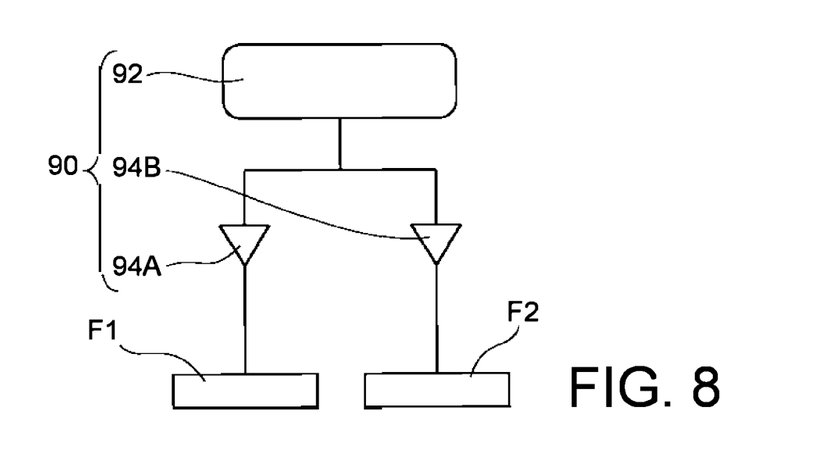
FIG. 8 is an outline diagram illustrating the operation of a unit for supplying damping fluid associated with the device of FIGS. 5 and 6.

FIG. 8 illustrates highly schematically the unit 90 supplying damping fluid, which in general terms comprises a damping fluid source 92, as well as means for controlling the supply of each of the damping fluid films F1 and F2 from the source 92, these control means comprising for example a first valve 94A disposed in a circuit ending at the first channel 70 for supplying damping fluid, and a second valve 94B disposed in a circuit ending at the second channel 86 for supplying damping fluid, so that the two valve 94A, 94B make it possible to selectively control the supply of damping fluid to the first cavity 37 and to the second cavity 82.

The source 92 typically comprises a reservoir of damping fluid and means for circulating this fluid, such as a pump.

Figure 9:
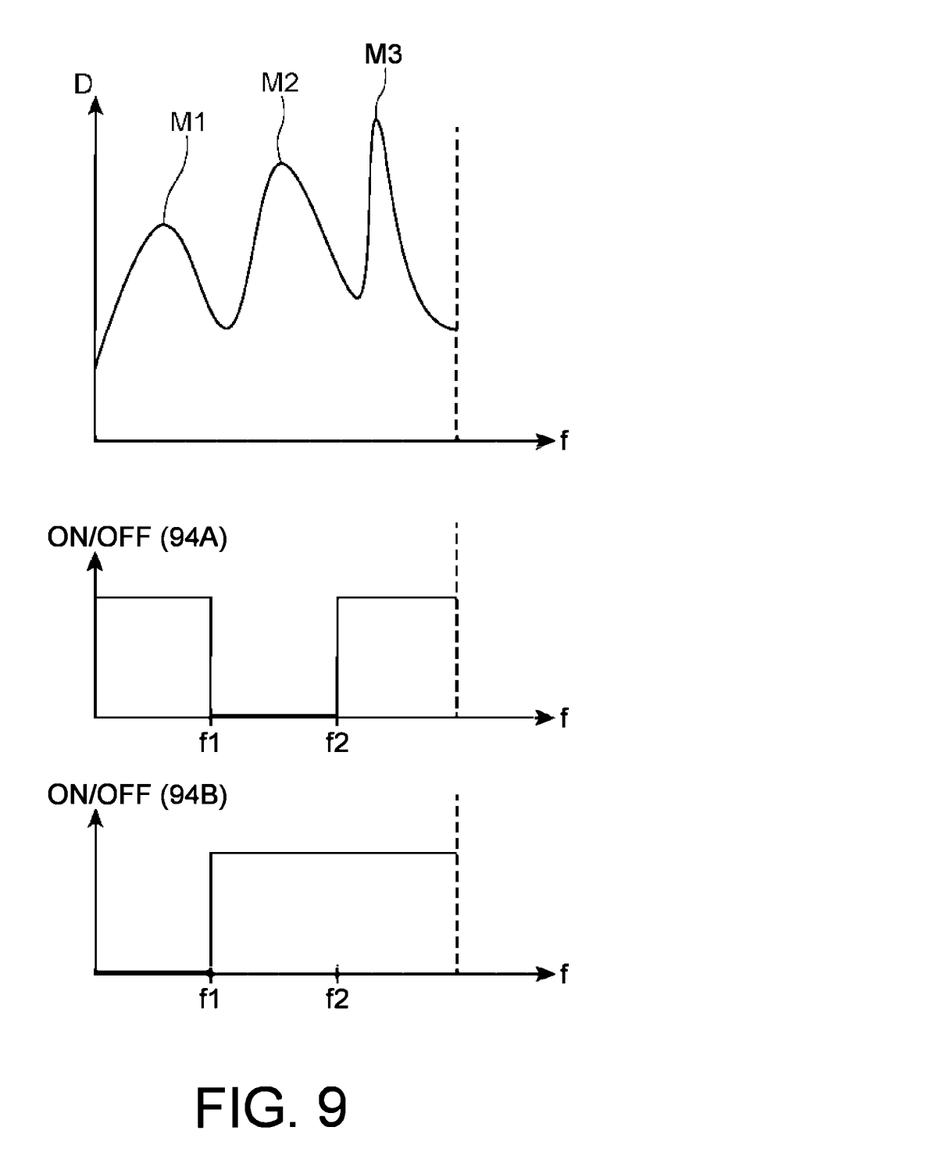
FIG. 9 is a double graph illustrating conjointly the active or inactive state of the two damping fluid films of the device of FIGS. 5 and 6, and the global damping procured by these two damping fluid films.

FIG. 9 illustrates the use of the device 30 associated with the unit 90 for supplying damping fluid. More precisely, FIG. 9 illustrates the damping capability D as a function of the rotation speed F of the shaft (the top part of FIG. 9), with regard to the open state (ON)/closed state (OFF) of the two valves 94A, 94B (bottom part of FIG. 9).

As shown by FIG. 9, in a lower rotation speed range, below a first speed threshold f1, the first valve 94A is in the open state ON (i.e. passing) while the second valve 94B is in the closed state OFF (i.e. blocking), so that the device 30 is using solely the first damping fluid film F1 and thus makes it possible to damp a first vibration mode M1. In an intermediate rotation speed range, lying between the first speed threshold f1 and a second speed threshold f2, the first valve 94A is in the closed state OFF while the second valve 94B is in the open state ON, so that the device 30 is using solely the second damping fluid film F2 and thus makes it possible to damp a second vibration mode M2. Finally, in a higher rotation speed range, beyond the second speed threshold f2, the first valve 94A and the second valve 94B are both in the open state ON, so that the device 30 is simultaneously using the two damping fluid films F1 and F2 and thus makes it possible to damp a third vibration mode M3.

The method described above can of course be adapted to the configuration of the vibration modes to be damped, and to the configuration of the device 30.

Figure 10:
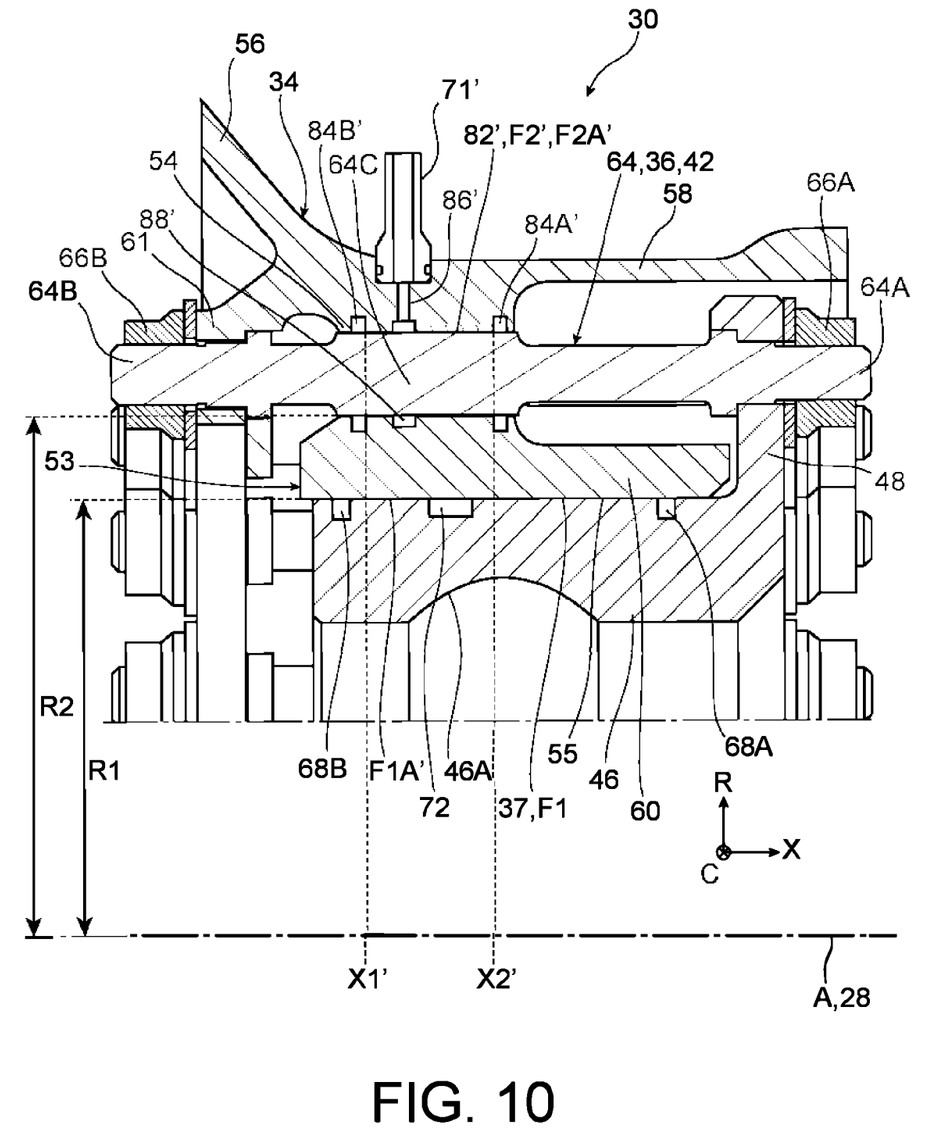
FIG. 10 is a view similar to FIG. 3, illustrating a device for the centring and rotational guidance of a shaft in a turbomachine, according to a second preferred embodiment of the invention.
Figure 11:
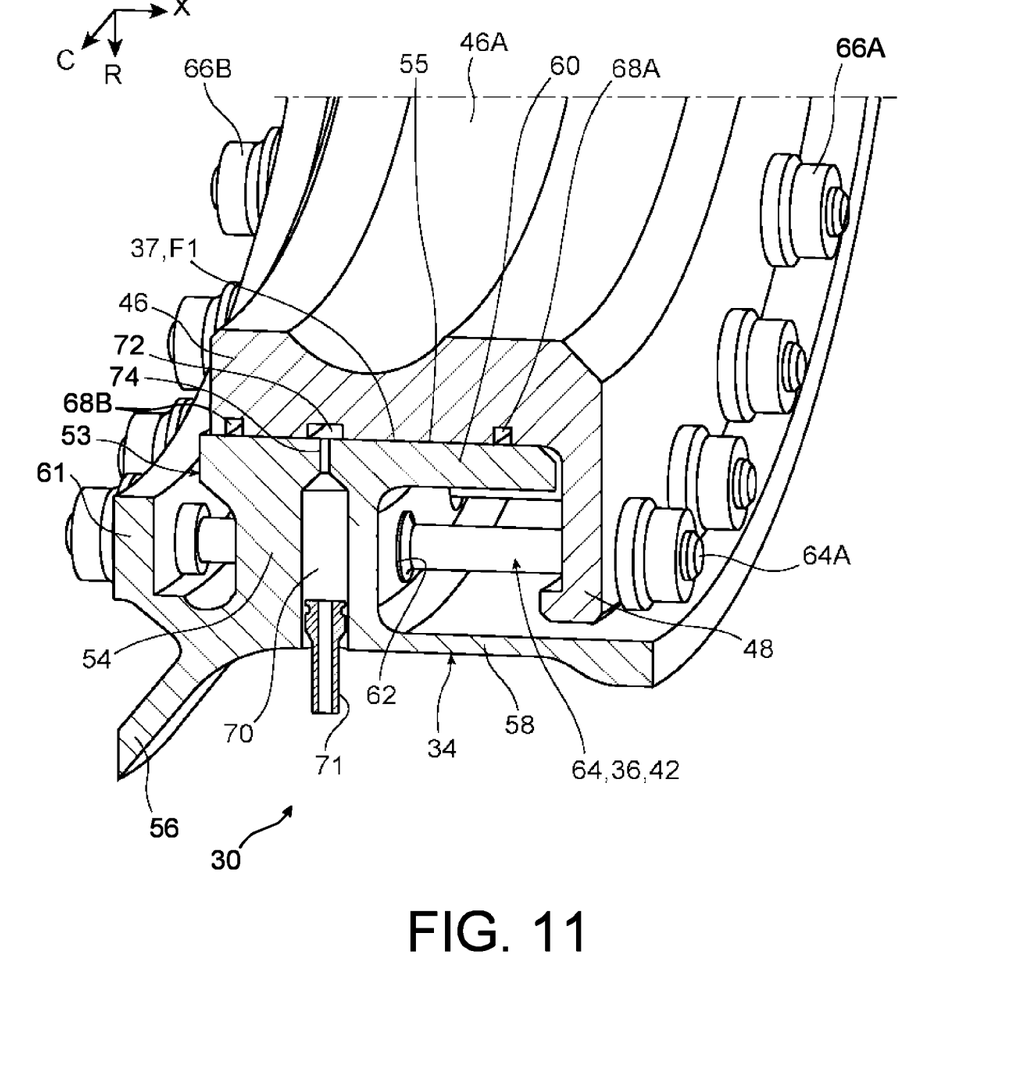
FIG. 11 is a view similar to FIG. 4, illustrating the device for the centring and rotational guidance of a shaft in a turbomachine, according to a second preferred embodiment of the invention.

FIGS. 10 and 11 illustrate a device 30 according to a second embodiment of the invention, comprising a plurality of second damping fluid films F2' formed around the respective intermediate parts 64C of at least some of the small columns 64, in the corresponding passages 62 of the annular body 53 of the bearing support 34.

Second damping fluid films F2' are for example formed around the respective intermediate parts 64C of one small column 64 out of three, or of two small columns 64 out of three, or around the respective intermediate parts 64C of all the small columns 64.

Thus the corresponding passages 62 comprise respectively second cavities 82' for receiving respectively the second damping fluid films F2'. These second cavities 82' are therefore, in more general terms, formed between the bearing support 34 and the elastically deformable structure 36, which forms part of the connecting structure 42, radially outwards with respect to the radially inner surface 55 of the annular body 53 of the bearing support 34. In addition, the second radial distance R2 therefore corresponds here to the minimum radial dimension of each of the passages 62.

In the example illustrated, each intermediate part 64C surrounded by a second damping fluid film F2' forms a cylindrical surface. Such a cylindrical surface enables the thickness of the corresponding second damping fluid film F2' to be optimum. By modulating the diameter of the cylindrical surface when the device 30 is designed, it is thus possible to modulate the thickness of the corresponding second damping fluid film F2', without changing the rest of the device 30.

Each second cavity 82' is typically delimited axially by two annular seals or two opposite sealing segments 84A' and 84B', disposed respectively in two annular grooves formed in the annular body 53 of the bearing support 34, or, in a variant, formed in the intermediate part 64C of the corresponding small column 64.

The second cavities 82' are furthermore connected respectively to second channels 86' for supplying damping fluid, formed through the bearing support 34, in this case through the annular body 53, for example radially outwards with respect to the second cavities 82'.

In the turbomachine, each second channel 86' supplying damping fluid is connected to the unit supplying damping fluid, which is not visible in FIGS. 10-11 with the exception of a pipe 71' (FIG. 10) forming part of an annular row of pipes by which the unit supplying damping fluid is connected respectively to the second channels 86' supplying damping fluid.

The annular body 53 advantageously includes annular distribution grooves 88', arranged respectively around the second cavities 82', and through which the second channels 86' supplying damping fluid respectively emerge, so as to facilitate the distribution of the damping fluid all around the intermediate part 64C of each corresponding small column 64. In a variant, such an annular distribution groove may be formed in the intermediate part 64C of each corresponding small column 64, opposite the corresponding second channel 86' supplying damping fluid.

In the example illustrated, each of the second damping fluid films F2' axially overlaps the first damping fluid film F1. In other words, the first damping fluid film F1 and each second damping fluid film F2' include respective portions F1A' and F2A' (FIG. 10) arranged opposite each other radially, i.e. delimited between two common axial dimensions X1' and X2'. As with the first embodiment, such a configuration optimises the compactness of the device 30, or conversely maximises the available volume for the damping fluid films F2' for a given overall size of the device 30.

The arrangement of second damping fluid films F2' around small columns 64 affords great latitude in the definition of the geometric parameters of these films, independently of the global geometric configuration of the device 30.

The operating mode of the device 30 of FIGS. 10 and 11 is analogous to that of the device 30 in FIGS. 5 and 6. In particular, the considerations developed above with reference to FIGS. 7-9 can easily be transposed to the device 30 of FIGS. 10 and 11.

In a variant, the device 30 may comprise, combined, the second damping fluid films F2 and F2' of the first embodiment and of the second embodiment described above.

According to yet other variants, a plurality of coaxial second damping fluid films F2, analogous to the film F2 of FIGS. 5 and 6, may be provided in the device 30. For this purpose, the connecting structure 42 may for example comprise a plurality of coaxial cylindrical rings arranged respectively opposite a plurality of corresponding cylindrical skirts of the bearing support 34.

The increase in the number of damping fluid films and the arrangement thereof in clearly distinct configurations can make it possible to increase the number of vibration modes treated by the device 30.

The invention claimed is:

1. A device for centering and rotationally guiding a turbomachine shaft, comprising:
    an rolling-element bearing comprising an outer race defining a bearing axis;
    a bearing support comprising an annular body having a radially inner annular surface surrounding the outer race;
    a connecting structure connecting the outer race to the bearing support and comprising an elastically deformable structure with which the connecting structure is connected to the bearing support;
    a first cavity formed between and delimited by the radially inner annular surface of the annular body and the outer race to receive a first damping fluid film; and
    at least one second cavity formed between and delimited by the bearing support and the connecting structure, and arranged radially outwards with respect to the radially inner annular surface of the annular body, to receive a second respective damping fluid film.

2. The device according to claim 1, wherein said at least one second cavity axially overlaps the first cavity.

3. The device according to claim 1, wherein said at least one second cavity has a thickness different from a thickness of the first cavity.

4. The device according to claim 1, wherein the annular body of the bearing support includes a radial annular portion that terminates, at a radially inner end thereof, in an annular heel defining the radially inner annular surface of the annular body, and wherein said at least one second cavity is arranged radially outwards with respect to the annular heel.

5. The device according to claim 1, wherein the connecting structure further includes an annular flange extending radially outwards from the outer race and connecting the outer race to the elastically deformable structure.

6. The device according to claim 5, wherein said at least one second cavity comprises at least one second cavity formed between an annular skirt, which extends from the annular body of the bearing support, and a cylindrical ring, which extends from the annular flange of the connecting structure.

7. The device according to claim 6, wherein the cylindrical ring extends axially between the annular flange of the connecting structure and the annular body of the bearing support.

8. The device according to claim 5, wherein the elastically deformable structure is formed from a plurality of columns distributed around the bearing axis and each having a respective first part mounted on the annular flange of the connecting structure, and a respective second part spaced apart from the respective first part and mounted on the bearing support.

9. The device according to claim 8, wherein
the bearing support includes an annular flange extending from the annular body, so that the annular body is arranged axially between the annular flange of the connecting structure and the annular flange of the bearing support;
the annular body of the bearing support includes a plurality of passages through which respective intermediate parts of the small columns extend respectively, arranged between the respective first parts and the respective second parts of the small columns;
the respective second parts of the small columns are mounted on the annular flange of the bearing support; and
said at least one second cavity comprises a plurality of second cavities formed around the respective intermediate parts of at least some of the small columns, in corresponding passages of the annular body of the bearing support, to receive respectively a plurality of second damping fluid films.

10. The device according to claim 9, wherein the annular body of the bearing support includes at least one first channel for supplying damping fluid, extending between two consecutive passages of said plurality of passages, and emerging in the first cavity, to supply the first cavity with damping fluid intended to form the first damping fluid film.

11. The device according to claim 1, further comprising control means for selectively controlling the supply of the first cavity, and of the second cavity or of each second cavity, with a damping fluid.

12. A turbomachine comprising at least one shaft centered and rotationally guided by at least one device according to claim 1.

13. The device according to claim 1, wherein the annular body of the bearing support is unitary and monolithic.

14. The device according to claim 4, wherein the annular body of the bearing support presents an L-shaped axial section.

\* \* \* \* \*